United States Patent
Suzuki et al.

(10) Patent No.: US 8,758,142 B2
(45) Date of Patent: Jun. 24, 2014

(54) GAME DEVICE, METHOD OF CONTROLLING A GAME DEVICE, PROGRAM, AND INFORMATION STORAGE MEDIUM

(75) Inventors: Satoshi Suzuki, Miyoshimachi (JP); Yuta Yahiro, Machida (JP)

(73) Assignee: Konami Digital Entertainment Co., Ltd., Tokyo (JP)

( * ) Notice: Subject to any disclaimer, the term of this patent is extended or adjusted under 35 U.S.C. 154(b) by 0 days.

(21) Appl. No.: 13/995,021

(22) PCT Filed: Apr. 26, 2012

(86) PCT No.: PCT/JP2012/061283
§ 371 (c)(1),
(2), (4) Date: Jun. 17, 2013

(87) PCT Pub. No.: WO2012/169296
PCT Pub. Date: Dec. 13, 2012

(65) Prior Publication Data
US 2013/0267330 A1 Oct. 10, 2013

(30) Foreign Application Priority Data
Jun. 6, 2011 (JP) ................................. 2011-125987

(51) Int. Cl.
*G07F 17/32* (2006.01)
(52) U.S. Cl.
USPC ............................................. 463/42; 463/31
(58) Field of Classification Search
USPC .................................................... 463/31, 42
See application file for complete search history.

(56) References Cited

U.S. PATENT DOCUMENTS

2004/0259616 A1 12/2004 Hirai

FOREIGN PATENT DOCUMENTS

| JP | 2004-321598 A | 11/2004 |
| JP | 2005-230265 A | 9/2005 |
| JP | 2007-160006 A | 6/2007 |
| JP | 4199140 B2 | 12/2008 |

OTHER PUBLICATIONS

"FIFA soccer comprehensive Wiki", http://www34.atwiki.jp/fifa/pages/49.html earliest known publication date is Jun. 3, 2011.
International Search Report for PCT/JP2012/061283, dated Jul. 10, 2012.

*Primary Examiner* — Omkar Deodhar
(74) *Attorney, Agent, or Firm* — Sughrue Mion, PLLC

(57) ABSTRACT

First control means (102) of a game device (10) moves a first instruction target of a user based on an operation state of a first operation member (44L). Second control means (104) causes each of characters (62) other than the first instruction target of the user to act based on an operation of a computer. Selection means (110) selects a second instruction target of the user based on a direction which is acquired based on an operation state of a second operation member. Third control means (106) causes, instead of action control performed by the second control means (104), the second instruction target selected by the selection means (110) to perform any one of a predetermined action and an action based on an operation state of one of a plurality of operation members (30) other than the first operation member (44L).

9 Claims, 9 Drawing Sheets

| OPERATION STATE | MOVING DIRECTION |
|---|---|
| UPWARD DIRECTION | POSITIVE $Z_w$-AXIS DIRECTION |
| RIGHTWARD DIRECTION | POSITIVE $X_w$-AXIS DIRECTION |
| DOWNWARD DIRECTION | NEGATIVE $Z_w$-AXIS DIRECTION |
| LEFTWARD DIRECTION | NEGATIVE $X_w$-AXIS DIRECTION |
| ⋮ | ⋮ |

| OPERATION STATE | ACTION INFORMATION |
|---|---|
| DEPRESS 42A | RUN IN POSITIVE Xw-AXIS DIRECTION |
| DEPRESS 42B | RUN TO VACANT SPACE |
| ⋮ | ⋮ |
| UPWARD DIRECTION | POSITIVE Zw-AXIS DIRECTION |
| RIGHTWARD DIRECTION | POSITIVE Xw-AXIS DIRECTION |
| DOWNWARD DIRECTION | NEGATIVE Zw-AXIS DIRECTION |
| LEFTWARD DIRECTION | NEGATIVE Xw-AXIS DIRECTION |
| ⋮ | ⋮ |

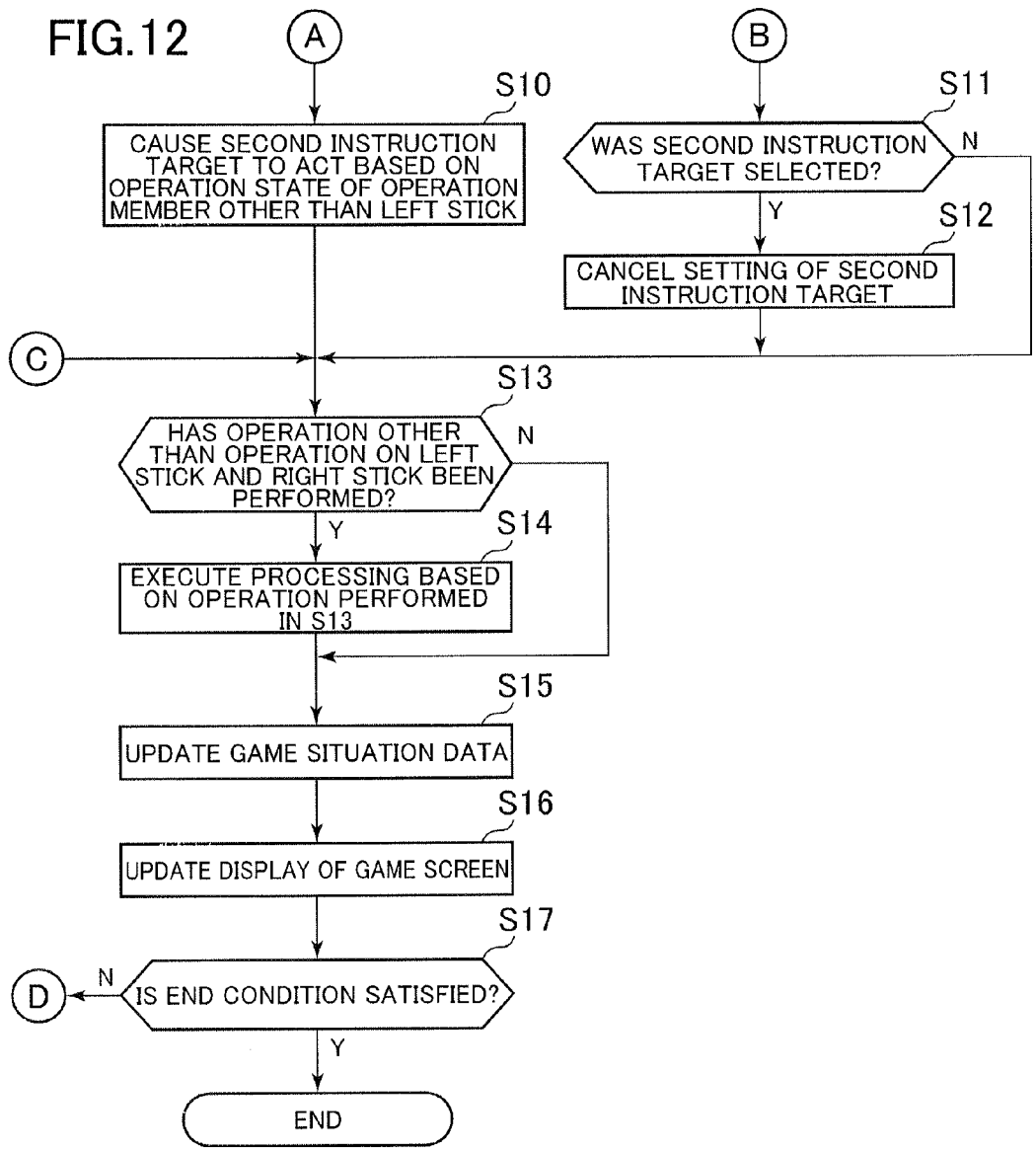

FIG.14

| OPERATION STATE | ACTION INFORMATION |
|---|---|
| UPWARD DIRECTION OR RIGHTWARD DIRECTION | POSITIVE Xw-AXIS DIRECTION |
| DOWNWARD DIRECTION OR LEFTWARD DIRECTION | NEGATIVE Xw-AXIS DIRECTION |

GAME DEVICE, METHOD OF CONTROLLING A GAME DEVICE, PROGRAM, AND INFORMATION STORAGE MEDIUM

CROSS REFERENCE TO RELATED APPLICATIONS

This application is a National Stage of International Application No. PCT/JP2012/061283 filed Apr. 26, 2013, claiming priority based on Japanese Patent Application No. 2011-125987 filed Jun. 6, 2011, the contents of all of which are incorporated herein by reference in their entirety.

TECHNICAL FIELD

The present invention relates to a game device, a method of controlling a game device, a program, and an information storage medium.

BACKGROUND ART

There has heretofore been known a game device for executing a game configured so that a plurality of characters move within a game space (for example, Patent Literature 1). A user gives an instruction on an action of a character, among the plurality of characters, that is set as an instruction target. Characters other than the instruction target of the user act based on operation of a computer.

There has also been known a technology in which when the user depresses a given button in a state in which the instruction target of the user faces another character, the other character moves in a direction that is determined in advance (Non Patent Literature 1).

CITATION LIST

Patent Literature

Patent Literature 1: JP 2004-321598 A

Non Patent Literature

Non Patent Literature 1: "FIFA soccer comprehensive Wiki, http://www34.atwiki.jp/fifa/pages/49.html"

SUMMARY OF INVENTION

Technical Problem

With the technology of Non Patent Literature 1, however, when moving other character, the user is required to cause the instruction target to face in the direction of the other character, and hence this technology has interfered with an operation of moving the instruction target by the user in some cases.

The present invention has been made in view of the above-mentioned problem, and has an object to provide a game device, a method of controlling a game device, a program, and an information storage medium which enable a user to give an instruction on an action of another character without interfering with an operation of moving an instruction target by the user.

Solution to Problems

In order to solve the above-mentioned problem, according to the present invention, there is provided a game device for executing a game configured so that a plurality of characters move within a game space, including: a plurality of operation members including a first operation member which is used by a user to perform a direction instruction operation and a second operation member which is used by the user to perform a direction instruction operation; first control means for moving a first instruction target of the user, among the plurality of characters, based on a moving direction which is acquired based on an operation state of the first operation member; second control means for causing each of characters of the plurality of characters other than the first instruction target of the user to act based on an operation of a computer; selection means for selecting, from among the characters on which the second control means performs action control, a second instruction target of the user based on a direction which is acquired based on an operation state of the second operation member; and third control means for causing, instead of the action control performed by the second control means, the second instruction target selected by the selection means to perform any one of a predetermined action and an action based on an operation state of one of the plurality of operation members other than the first operation member.

According to the present invention, there is also provided a method of controlling a game device for executing a game configured so that a plurality of characters move within a game space, including: a step of acquiring information indicating operation states of a plurality of operation members including a first operation member which is used by a user to perform a direction instruction operation and a second operation member which is used by the user to perform a direction instruction operation; a first control step of moving a first instruction target of the user, among the plurality of characters, based on a moving direction which is acquired based on an operation state of the first operation member; a second control step of causing each of characters of the plurality of characters other than the first instruction target of the user to act based on an operation of a computer; a selection step of selecting, from among the characters on which action control is performed in the second control step, a second instruction target of the user based on a direction which is acquired based on an operation state of the second operation member; and a third control step of causing, instead of the action control performed in the second control step, the second instruction target selected in the selection step to perform any one of a predetermined action and an action based on an operation state of one of the plurality of operation members other than the first operation member.

According to the present invention, there is further provided a program for causing a computer to function as a game device for executing a game configured so that a plurality of characters move within a game space, the program causing the computer to function as: means for acquiring information indicating operation states of a plurality of operation members including a first operation member which is used by a user to perform a direction instruction operation and a second operation member which is used by the user to perform a direction instruction operation; first control means for moving a first instruction target of the user, among the plurality of characters, based on a moving direction which is acquired based on an operation state of the first operation member; second control means for causing each of characters of the plurality of characters other than the first instruction target of the user to act based on an operation of the computer; selection means for selecting, from among the characters on which the second control means performs action control, a second instruction target of the user based on a direction which is acquired based on an operation state of the second operation member; and third control means for causing, instead of the action control performed by the second control means, the second instruction target selected by the selection means to perform any one of a predetermined action and an action based on an operation state of one of the plurality of operation members other than the first operation member.

According to the present invention, there is further provided a non-transitory computer-readable information storage medium having the above-mentioned program recorded thereon.

According to the present invention, it is possible to enable a user to give an instruction on an action of another character without interfering with an operation of moving an instruction target by the user.

Further, according to an aspect of the present invention, the third control means includes: means for acquiring a game parameter from means for storing the game parameter in association with a combination of the plurality of characters; and means for restricting, regarding the second instruction target, any one of the predetermined action and the action based on the operation state of the one of the plurality of operation members other than the first operation member, based on the game parameter associated with a combination of the first instruction target and the second instruction target.

Further, according to an aspect of the present invention, the third control means includes: means for acquiring a game parameter from means for storing the game parameter in association with a combination of the plurality of characters; and means for causing, regarding the second instruction target, an execution start of any one of the predetermined action and the action based on the operation state of the one of the plurality of operation members other than the first operation member, to wait based on the game parameter associated with a combination of the first instruction target and the second instruction target.

Further, according to an aspect of the present invention, the third control means includes: means for determining whether or not a distance between the first instruction target and the second instruction target is a reference distance or longer; and means for causing, in a case where the distance between the first instruction target and the second instruction target is the reference distance or longer, in place of action control performed by the third control means, the second control means to perform the action control on the second instruction target.

Further, according to an aspect of the present invention, the game device further includes: means for acquiring count information on a number of times the third control means has previously performed action control on the second instruction target, from means for storing the count information; means for determining whether or not the number of times the third control means has previously performed the action control on the second instruction target is a predetermined number of times or more; and means for restricting, in a case where the number of times the third control means has previously performed the action control on the second instruction target is the predetermined number of times or more, any one of selection processing by the selection means and the action control by the third control means.

BRIEF DESCRIPTION OF DRAWINGS

[FIG. 12] A flowchart illustrating the processing executed by the game device.
[FIG. 13] A diagram illustrating a data storage example of a game parameter.
[FIG. 14] A diagram illustrating association between the operation state of the operation member and the action information indicating an action to be performed by the second instruction target.

DESCRIPTION OF EMBODIMENT

[1. Embodiment]
An exemplary embodiment of the present invention is described in detail below with reference to the drawings. A game device according to the embodiment of the present invention is implemented by, for example, a consumer game device (stationary game device), a portable game device, a cellular phone (smartphone), a personal digital assistant, or a personal computer. The description given here is about the case where the game device according to the embodiment of the present invention is implemented by a consumer game device.

Figure 1:
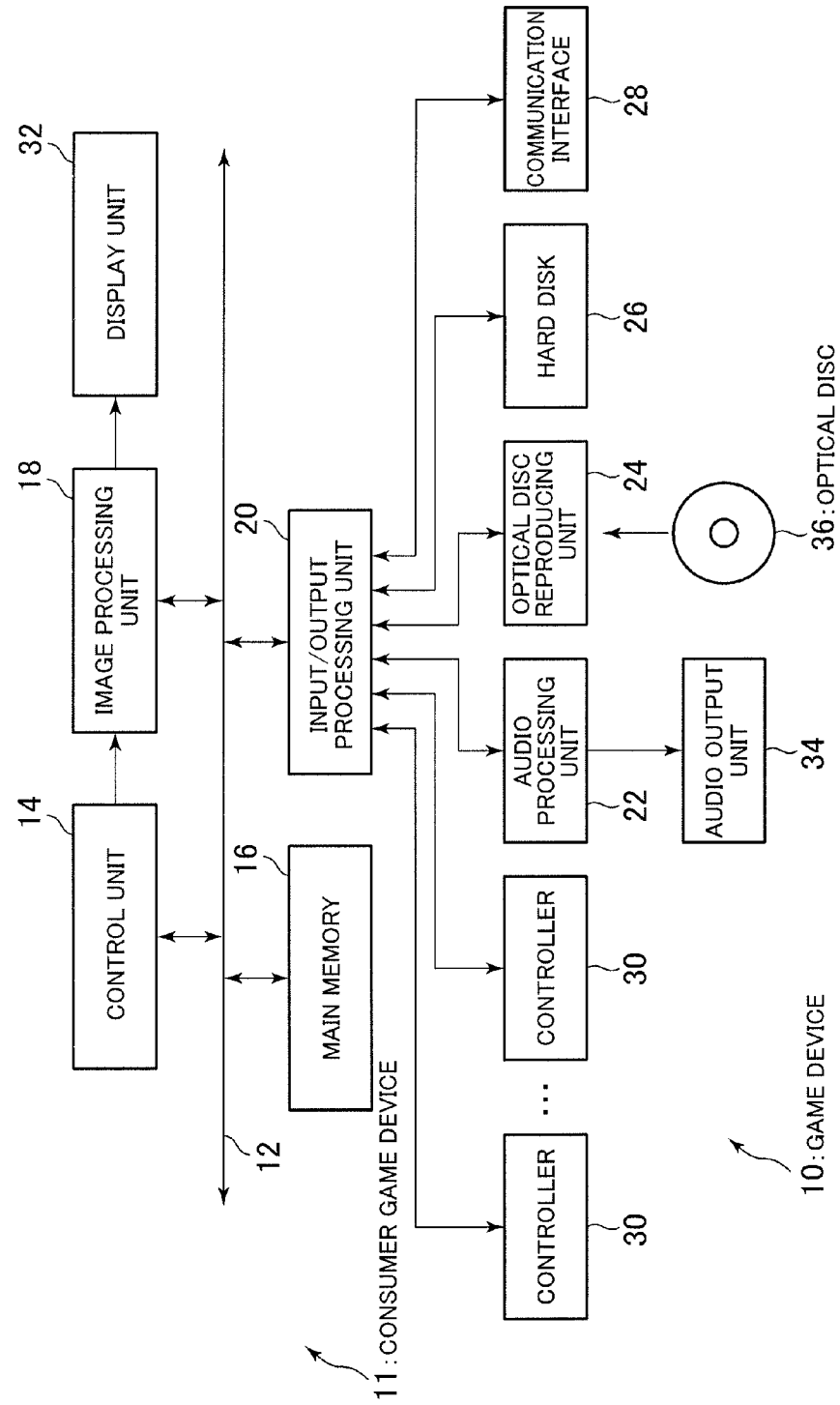
[FIG. 1] A diagram illustrating the hardware configuration of a game device according to an embodiment of the present invention.

[1-1. Hardware Configuration of the Game Device]
FIG. 1 illustrates the hardware configuration of the game device according to the embodiment of the present invention. A game device 10 illustrated in FIG. 1 includes a consumer game device 11, a display unit 32, an audio output unit 34, and an optical disc 36 (information storage medium).

The display unit 32 and the audio output unit 34 are connected to the consumer game device 11. The display unit 32 can be, for example, a home-use television set or a liquid crystal display. The audio output unit 34 can be, for example, a speaker built in a home-use television set or headphones.

The consumer game device 11 is a known computer game system. The consumer game device 11 includes a bus 12, a control unit 14, a main memory 16, an image processing unit 18, an input/output processing unit 20, an audio processing unit 22, an optical disc reproducing unit 24, a hard disk 26, a communication interface 28, and a controller 30.

The control unit 14 includes one or a plurality of control units (for example, CPUs). The control unit 14 executes processing of controlling the respective units of the consumer game device 11 and information processing, based on an operating system stored in a ROM (not shown) and a program read from the optical disc 36.

The main memory 16 includes a RAM, for example, and programs and data read from the optical disc 36 are written into the main memory 16. The main memory 16 is also used as a working memory for the control unit 14. The bus 12 is used for communicating addresses and data among the units of the consumer game device 11.

The image processing unit 18 includes a VRAM. The image processing unit 18 renders a game screen in the VRAM based on image data supplied from the control unit 14. The game screen rendered in the VRAM is converted into video signals, and the signals are then output to the display unit 32 at a predetermined timing.

The input/output processing unit 20 is an interface for the control unit 14 to access the audio processing unit 22, the optical disc reproducing unit 24, the hard disk 26, the communication interface 28, and the controller 30.

The audio processing unit 22 includes a sound buffer. The audio processing unit 22 outputs, from the audio output unit 34, audio data loaded from the optical disc 36 into the sound buffer.

The communication interface 28 is an interface for connecting the consumer game device 11 by wire or wirelessly to a communication network, such as the Internet.

The optical disc reproducing unit 24 reads programs and data recorded on the optical disc 36. In this embodiment, description is given of a case where the optical disc 36 is used to supply programs and data to the consumer game device 11, but another information storage medium, such as a memory card, may be used to supply programs and data to the consumer game device 11. In addition, for example, programs and data may be supplied to the consumer game device 11 from a remote location via a communication network.

The hard disk 26 is a commonly-used hard disk device (auxiliary storage device). Note that in this embodiment, the programs and data that are described as being stored in the optical disc 36 may be stored in the hard disk 26 instead.

The controller 30 is general-purpose operation means for receiving various game operations by the user. One or a plurality of the controllers 30 are connected to the consumer game device 11 by wire or wirelessly.

Figure 2:
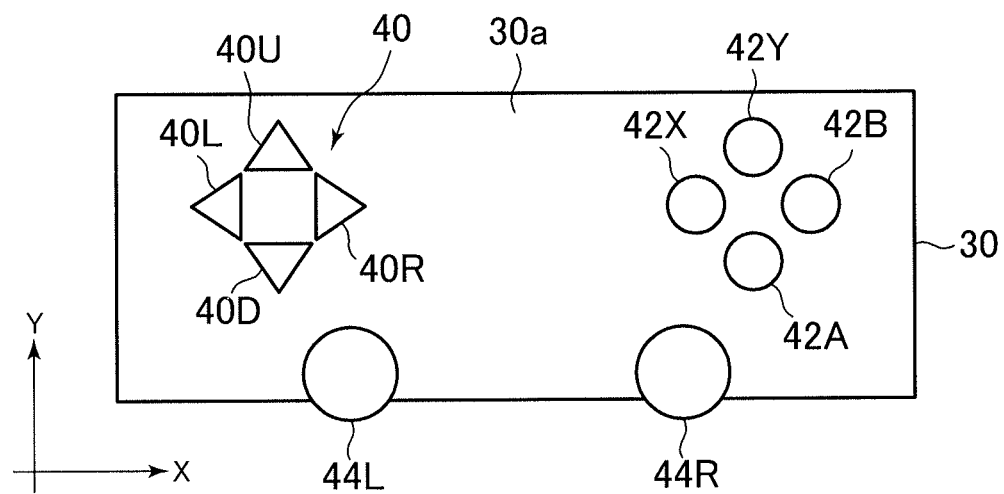
[FIG. 2] A diagram illustrating an example of a controller.
Figure 3:
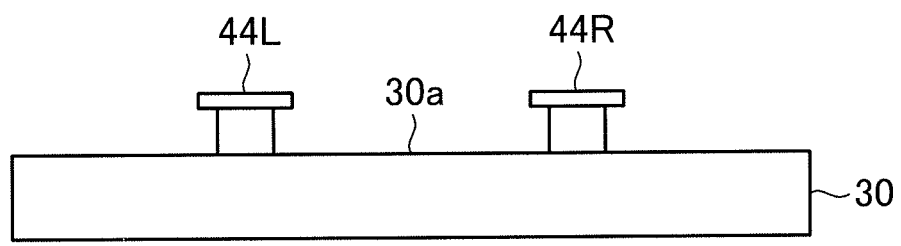
[FIG. 3] A diagram illustrating the example of the controller.

FIGS. 2 and 3 illustrate an example of the controller 30. Note that in FIG. 2, an X-axis corresponds to a long-axis direction of the controller 30 (left-right direction), and a Y-axis corresponds to a short-axis direction of the controller 30 (up-down direction). The X-axis and the Y-axis are orthogonal to each other. The positive Y-axis direction may be hereinafter referred to as "upward direction" and the negative Y-axis direction as "downward direction". The positive X-axis direction may be referred to as "rightward direction" and the negative X-axis direction as "leftward direction".

There are disposed, on a front side 30a of the controller 30, a direction button group 40 and buttons 42A, 42B, 42×, and 42Y. Further, the controller 30 also includes sticks (levers) 44L and 44R. The direction button group 40 includes an up direction button 40U corresponding to the upward direction, a down direction button 40D corresponding to the downward direction, a left direction button 40L corresponding to the leftward direction, and a right direction button 40R corresponding to the rightward direction. The user uses the direction button group 40 to perform a direction instruction operation. An action performed by the user to depress any direction button of the direction button group 40 corresponds to the "direction instruction operation".

The left stick 44L and the right stick 44R stand erect on the front side 30a of a casing of the controller 30, and are configured to be tiltable in all (360-degree) directions by a given angle from the erect state. Tilt information about the tilt of the left stick 44L and the right stick 44R in an up-down direction and a left-right direction is input to the consumer game device 11. For example, the left stick 44L and the right stick 44R are also used by the user to perform the direction instruction operation. An action of tilting the left stick 44L and the right stick 44R by the user corresponds to the "direction instruction operation".

Moreover, in this embodiment, the user pushes the left stick 44L and the right stick 44R. When the user pushes the left stick 44L or the right stick 44R, the left stick 44L or the right stick 44R generates a given operation signal. In other words, the user can also depress the left stick 44L and the right stick 44R in the same manner as in the direction button group 40.

The buttons 42A, 42B, 42×, and 42Y are used in various game operations. The buttons 42A, 42B, 42×, and 42Y may each be used for the direction instruction operation.

As described above, the controller 30 includes a plurality of operation members (for example, the direction button group 40 and the buttons 42A, 42B, 42×, and 42Y) including a first operation member (for example, the left stick 44L) which is used by the user to perform the direction instruction operation, and a second operation member (for example, the right stick 44R) which is used by the user to perform the direction instruction operation.

The input/output processing unit 20 scans a state of each of the operation members of the controller 30 at fixed intervals (for example, every $1/60^{th}$ of a second). An operation signal representing scan results thus obtained is input to the control unit 14 via the bus 12. The tilt information of each of the left stick 44L and the right stick 44R is also supplied to the control unit 14 as the operation signal. Based on the operation signal, the control unit 14 determines a game operation performed by the user.

[1-2. Game Executed by the Game Device]

The game device 10 executes a game program read from the optical disc 36 to execute, for example, a game configured so that a plurality of characters move within a game space. The following description is directed to a case where a soccer game configured so that a plurality of player characters move within a game space that imitates a venue for a soccer match to play the soccer match is executed.

In the soccer game, a soccer match is played between a team operated by the user (hereinafter referred to as "user team") and a team operated by an opponent (computer or another user) (hereinafter referred to as "opponent team"). When the soccer game is started, for example, the game space is built in the main memory 16.

Figure 4:
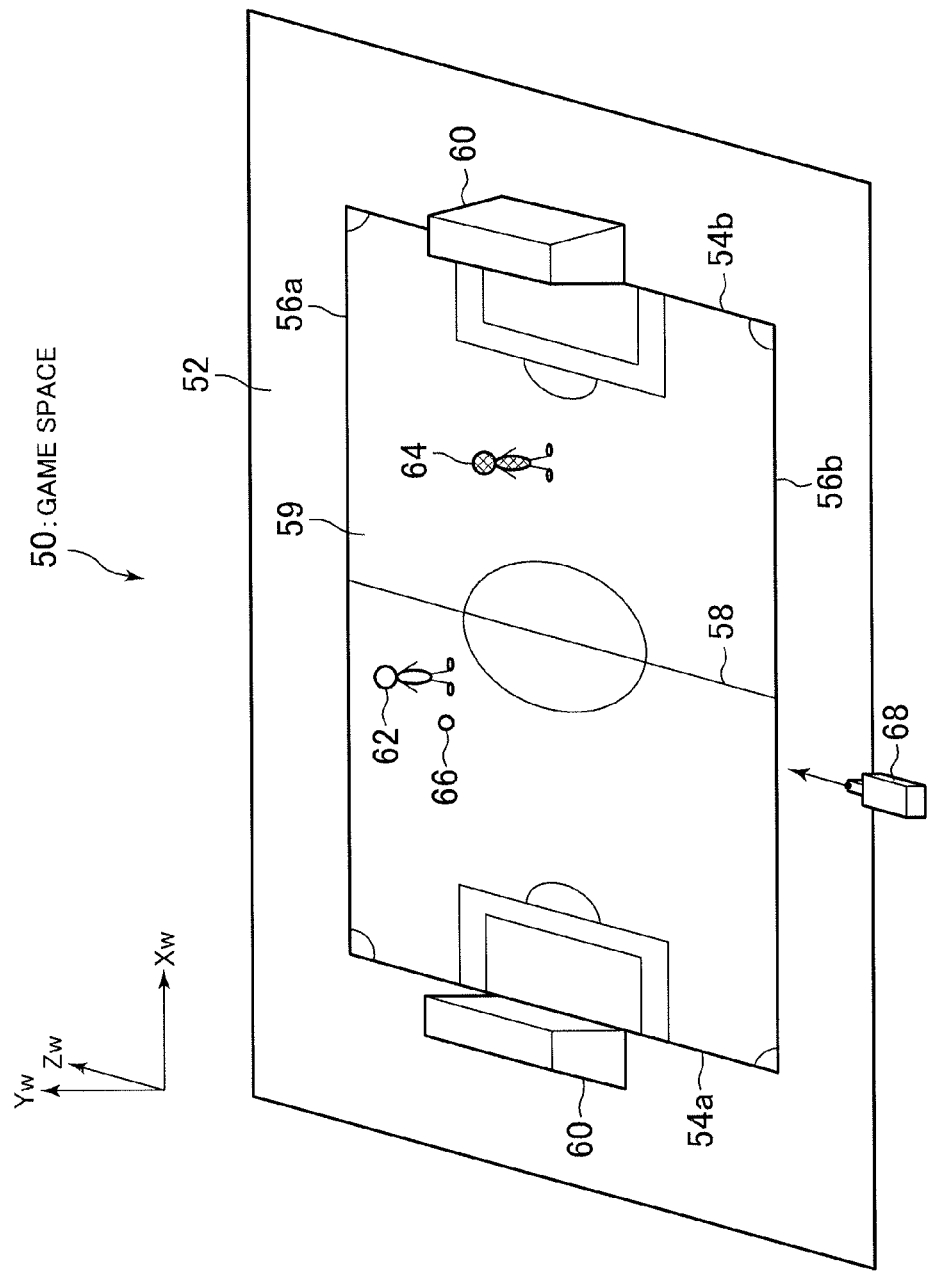
[FIG. 4] A diagram illustrating an example of a game space.

FIG. 4 is a diagram illustrating an example of the game space. A game space 50 illustrated in FIG. 4 is a virtual three-dimensional space in which three axes of coordinates (Xw-axis, Yw-axis, and Zw-axis) orthogonal to one another are set. As illustrated in FIG. 4, in the game space 50, there is disposed a field 52, which is an object representing a soccer field.

Displayed on the field 52 are two goal lines 54a and 54b, two touchlines 56a and 56b, and a center line 58. A match is played within a pitch 59 surrounded by the two goal lines 54a and 54b and the two touchlines 56a and 56b, and around the pitch 59 (predetermined region which is outside the pitch 59 and is in contact with the goal line 54a or 54b or the touchline 56a or 56b).

Also disposed on the field 52 are goals 60, which are objects representing soccer goals, player characters 62, which are objects representing soccer players belonging to the user team, player characters 64, which are objects representing soccer players belonging to the opponent team, and a ball 66, which is an object representing a soccer ball (moving object). The positions of the respective objects are identified by, for example, three-dimensional coordinates within a world coordinate system (Xw-Yw-Zw coordinate system).

Note that 11 player characters 62 belonging to the user team and 11 player characters 64 belonging to the opponent team are disposed on the field 52, but are omitted in FIG. 4.

When the player character 62 (64) and the ball 66 come close to each other, the player character 62 (64) and the ball 66 become associated with each other under a predetermined condition. In this case, the moving action of the player character 62 (64) becomes a dribbling action. The state in which the ball 66 is associated with the player character 62 (64) is hereinafter referred to as a state in which "the player character 62 (64) is keeping the ball 66".

Further, in the game space 50, a virtual camera 68 (viewpoint) is set. A game screen showing a state in which the game space 50 is viewed from the virtual camera 68 is displayed on the display unit 32. The game screen is generated by using a predetermined coordinate conversion operation to convert coordinates of vertices of the respective objects disposed in the game space 50 from a world coordinate system into a screen coordinate system.

Figure 5:
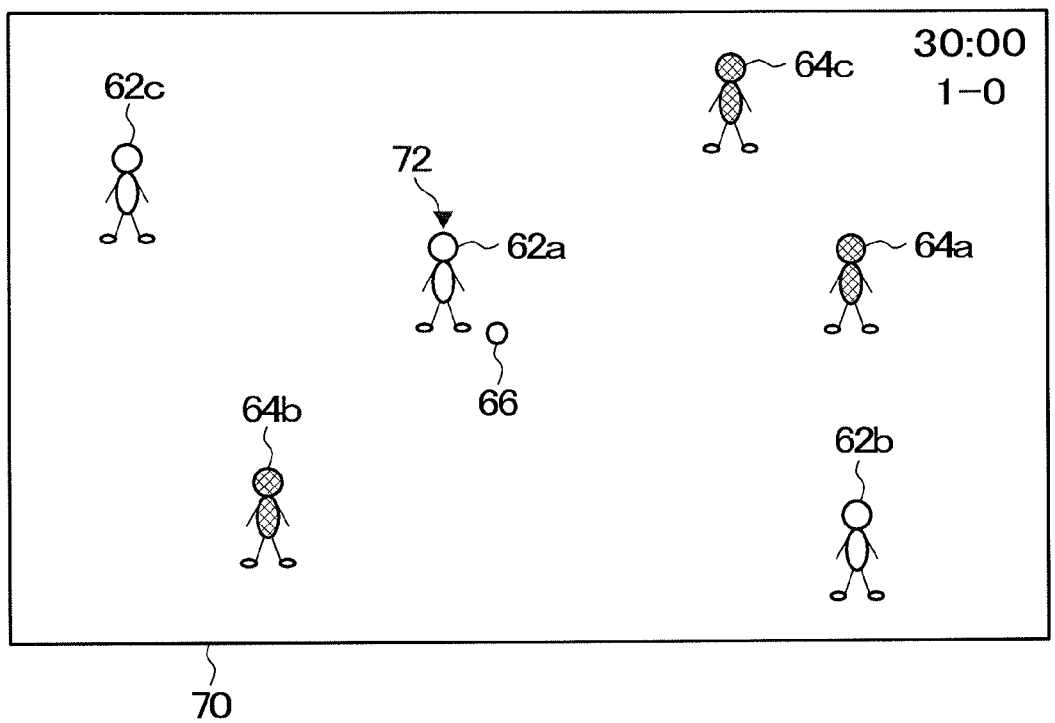
[FIG. 5] A diagram illustrating an example of a game screen which is displayed on a display unit.

FIG. 5 is a diagram illustrating an example of the game screen which is displayed on the display unit 32. A game screen 70 illustrated in FIG. 5 includes three player characters 62a, 62b, and 62c belonging to the user team, three player characters 64a, 64b, and 64c belonging to the opponent team, and the ball 66.

For example, one of the player characters 62 belonging to the user team acts based on the operation of the user. In this embodiment, this player character 62 is referred to as the first instruction target of the user. In the state illustrated in FIG. 5, for example, the player character 62a keeping the ball 66 is set as the first instruction target of the user. Above the head of the player character 62a, a cursor 72 indicating that the player character 62a is set as the first instruction target of the user is displayed. With the aid of the cursor 72, the user identifies the first instruction target from among the player characters 62 belonging to the user team.

For example, the user tilts the left stick 44L to perform the direction instruction operation, to thereby move the player character 62a as the first instruction target. As illustrated in FIG. 5, for example, when the player character 62a is keeping the ball 66, the user tilts the left stick 44L to give an instruction on a direction in which the player character 62a is to dribble the ball.

Of the player characters 62 (64) disposed in the game space 50, the player characters that do not serve as the first instruction target of the user act autonomously in accordance with a predetermined action algorithm. For example, the player characters 62 other than the player character 62a (such as the player characters 62b and 62c) act based on an operation of a computer.

In this embodiment, by pushing the right stick 44R and then tilting the right stick 44R in a predetermined direction, the user can cause the player character 62 existing, with the first instruction target as a reference, in the direction in which the right stick 44R has been tilted to act based on the instruction of the user. This player character 62 is hereinafter referred to as second instruction target. For example, when the user pushes the right stick 44R and tilts the right stick 44R in the leftward direction in a state in which the user keeps pushing the right stick 44R, the player character 62c existing in the leftward direction of the player character 62a is set as the second instruction target.

Figure 6:
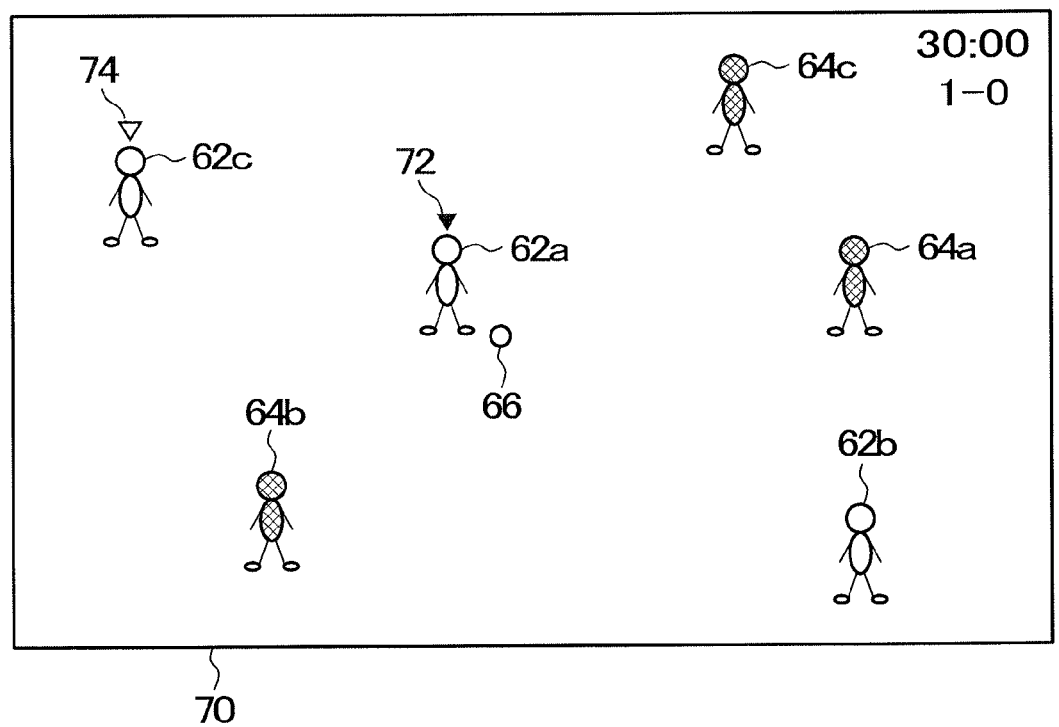
[FIG. 6] A diagram illustrating an example of the game screen which is displayed when a second instruction target is set.

FIG. 6 is a diagram illustrating an example of the game screen 70 which is displayed when the second instruction target is set. The game screen 70 illustrated in FIG. 6 is displayed when, in the game screen 70 illustrated in FIG. 5, the user pushes the right stick 44R and then tilts the right stick 44R in the leftward direction. For example, above the head of the player character 62c disposed on a left side of the player character 62a, a cursor 74 is displayed. The cursor 74 is an index indicating the player character 62 set as the second instruction target. Note that it is preferred that the cursor 72 and the cursor 74 be different images which are distinguishable from each other.

For example, the user can use the right stick 44R to move the player character 62c above whose head the cursor 74 is displayed. Note that in the state illustrated in FIG. 6, the user can also move the player character 62a by tilting the left stick 44L. In other words, the user is allowed to move both the player character 62a and the player character 62c.

When the user cancels the pushing of the right stick 44R in the state of FIG. 6, the cursor 74 displayed above the head of the player character 62c is erased, and the player character 62c returns to the state of being operated by the computer. In other words, the game screen 70 returns to the state of FIG. 5, and the user uses the left stick 44L to move only the player character 62a.

As described above, in the game device 10 of this embodiment, by pushing the right stick 44R and then tilting the right stick 44R in the predetermined direction, the user can temporarily give an instruction on the action of the second instruction target. This technology is described below in detail.

[1-3. Functions Implemented by the Game Device]

Figures 7, 8:
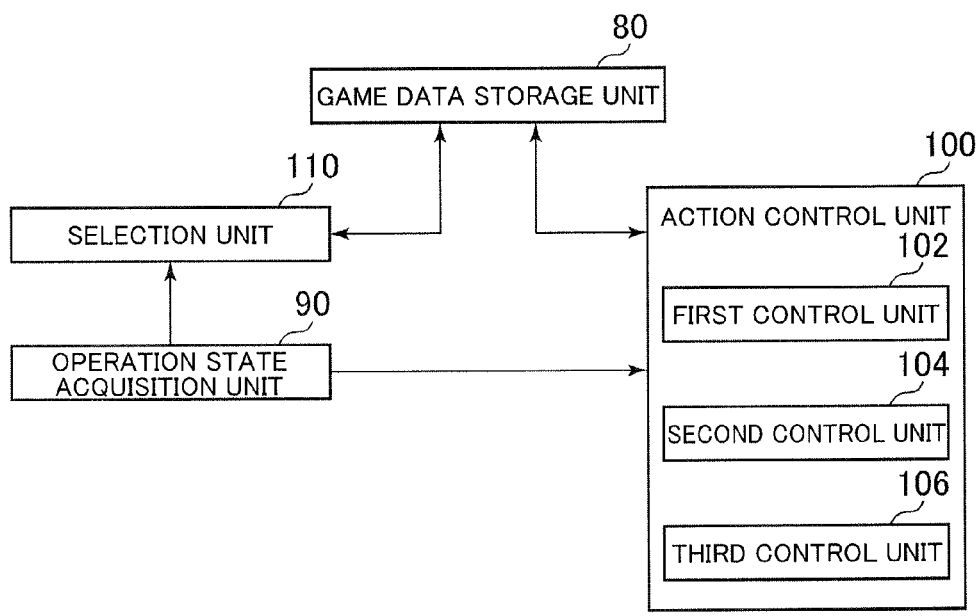
[FIG. 7] A functional block diagram illustrating functions relating to the present invention among functions implemented by the game device.
[FIG. 8] A diagram illustrating association between an operation state of a left stick and a moving direction.

FIG. 7 is a functional block diagram illustrating functions relating to the present invention among functions implemented by the game device 10. As illustrated in FIG. 7, the game device 10 executes the game program, to thereby implement a game data storage unit 80, an operation state acquisition unit 90, an action control unit 100, and a selection unit 110.

[1-3-1. Game Data Storage Unit]

The game data storage unit 80 is implemented mainly by, for example, the main memory 16, the optical disc 36, and the like. The game data storage unit 80 stores, for example, data necessary to implement a soccer game. For example, game situation data indicating a current state of the soccer game is stored in the game data storage unit 80.

The game situation data includes, for example, the following pieces of data:

(1) data indicating a current state (for example, the position, the posture, the moving direction, and the moving speed) of each of the player characters 62 (64);

(2) data indicating the player character 62 which is set as the first instruction target of the user;

(3) data indicating the player character 62 which is set as the second instruction target of the user;

(4) data indicating a current state (for example, the position, the moving direction, and the moving speed) of the ball 66;

(5) data indicating the player character 62 (64) keeping the ball 66;

(6) data indicating a current state (for example, the position and the sight line direction) of the virtual camera 68; and (7) data indicating situations of the match (for example, the score of both teams and the elapsed time period) and other such data.

Note that the control unit 14 functions as means for acquiring the data stored in the game data storage unit 80. The control unit 14 also functions as means for updating the data stored in the game data storage unit 80. Note that the data stored in the game data storage unit 80 is not limited to the above-mentioned examples. The game data storage unit 80 may store other types of data, for example, various parameters regarding the player character 62 (64).

[1-3-2. Operation State Acquisition Unit]

The operation state acquisition unit 90 is realized mainly by, for example, the control unit 14 and the controller 30. The operation state acquisition unit 90 acquires, from the plurality of operation members (for example, the direction button group 40 and the buttons 42A, 42B, 42x, and 42Y) including the first operation member (for example, the left stick 44L) which is used by the user to perform the direction instruction operation and the second operation member (for example, the right stick 44R) which is used by the user to perform the direction instruction operation, information indicating the operation state thereof.

For example, the operation state acquisition unit 90 acquires information indicating the operation state of the left stick 44L or the right stick 44R, based on the tilt information obtained when the user tilts the left stick 44L or the right stick 44R. The operation state acquisition unit 90 also acquires, for example, information indicating the operation state of each of the plurality of operation members, based on a detection signal obtained when the user depresses each of the plurality of operation members.

Note that in this embodiment, a case where the left stick 44L or the right stick 44R can be subjected to a pushing operation (pressing operation) by the user is described. When the left stick 44L or the right stick 44R is pushed, a given detection signal is generated. Further, in this embodiment, a case where the plurality of operation members are provided in the same casing is described, but the plurality of operation members may be provided respectively in different casings.

[1-3-3. Action Control Unit]

The action control unit 100 is realized mainly by the control unit 14. The action control unit 100 causes the plurality of player characters 62 (64) to act within the game space 50. For example, the action control unit 100 updates the position of the player character 62 (64) stored in the game situation data to a position as a moving destination, which is determined based on a method to be described later, to thereby cause the player character 62 (64) to act within the game space 50.

[First Control Unit]

A first control unit 102 moves the first instruction target of the user among a plurality of characters (for example, the player characters 62 (64)) based on a moving direction which is acquired based on the operation state of the first operation member (for example, the left stick 44L). The moving direction acquired based on the operation state of the left stick 44L means the moving direction determined based on the direction instruction operation performed by the user using the left stick 44L.

FIG. 8 is a diagram illustrating association between the operation state of the left stick 44L and the moving direction. As illustrated in FIG. 8, the tilt information obtained from the left stick 44L and the moving direction of the player character 62 are associated with each other in advance to be stored in the game data storage unit 80. For example, the first control unit 102 moves the player character 62 in the moving direction associated with the tilt information by a distance corresponding to the moving speed of the player character 62.

[Second Control Unit]

A second control unit 104 causes each of characters of the plurality of characters (for example, the player characters 62 (64)) other than the first instruction target of the user to act based on the operation of the computer. The second control unit 104 causes the player characters 62 other than the first instruction target of the user to act based on an action algorithm defined in the game program.

Various types of action control executed in a known soccer game are applicable to the action control performed by the second control unit 104. For example, the second control unit 104 causes the player characters 62 (64) to act based on the positional relationship among the player characters 62 (64) and the positional relationship between each of the player characters 62 (64) and the ball 66.

[1-3-4. Selection Unit]

The selection unit 110 is realized mainly by the control unit 14. The selection unit 110 selects, from among the characters on which the second control unit 104 performs the action control, the second instruction target of the user based on a direction which is acquired based on the operation state of the second operation member (for example, the right stick 44R). The direction acquired based on the operation state of the right stick 44R means a direction determined based on the tilt information on the right stick 44R. For example, in the same manner as in the association illustrated in FIG. 8, the operation state of the right stick 44R and the above-mentioned direction may be associated with each other to be stored.

In this embodiment, a case where the selection unit 110 selects the player character 62 based on the position of the player character 62 (64) keeping the ball 66, or the ball 66, and on the direction acquired based on the operation state of the right stick 44R, is described.

Figures 9, 10:
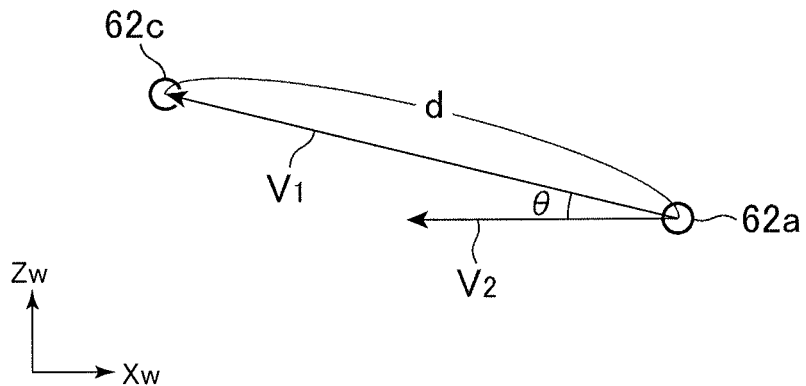
[FIG. 9] A diagram illustrating a method of selecting a player character by a selection unit.
[FIG. 10] A diagram illustrating association between an operation state of an operation member and action information indicating an action to be performed by the second instruction target.

FIG. 9 is a diagram illustrating a method of selecting the player character 62 by the selection unit 110. In FIG. 9, a case where the player character 62a is keeping the ball 66 is described. For example, based on a distance d between the position of the player character 62a keeping the ball 66 (or the position of the ball 66) and another player character 62 (for example, the player character 62c) and on an angle θ between a direction $V_1$ connecting the position of the player character 62a keeping the ball 66 (or the position of the ball 66) and the player character 62 and a direction $V_2$ acquired based on the operation state of the right stick 44R, the player character 62 is selected.

Based on an evaluation value which is calculated by substituting the above-mentioned calculated distance d and angle θ into a given arithmetic expression, the player character 62 is selected. For example, the player character 62 whose distance d is short and whose angle θ is small is selected as the second instruction target. For example, the player character 62 whose value of an outer product of the direction $V_1$ and the direction $V_2$ ($|V_1|*|V_2|*\sin θ$) is the smallest (note that the player character 62 to be selected is limited to one that satisfies a relationship of $\cos θ > 0$) is selected as the second instruction target.

[Third Control Unit]

A third control unit 106 causes, instead of the action control performed by the second control unit 104, the second instruction target selected by the selection unit 110 to perform an action based on the operation state of one of the plurality of operation members (for example, the right stick 44R) other than the first operation member (for example, the left stick 44L), or a predetermined action.

In other words, when the second instruction target is selected by the selection unit 110, the third control unit 106 imposes a restriction on the second instruction target acting (inhibits the second instruction target from acting) based on the second control unit 104, and performs control so that the second instruction target is prevented from acting based on the operation of the computer. As a result, the second instruction target is made to act as instructed by the user.

FIG. 10 is a diagram illustrating association between the operation state of the operation member and action information indicating an action to be performed by the second instruction target. A case where the second instruction target performs an action based on the operation state of the right stick 44R is described below. As illustrated in FIG. 10, for example, the third control unit 106 moves the second instruction target in the moving direction associated with the tilt information on the right stick 44R. Alternatively, for example, the action information may be set so that based on the tilt information on the right stick 44R, the second instruction target can move in any direction, that is, through 360 degrees. Note that the action information can be rephrased as information defining an action that the user instructs the second instruction target to perform.

[1-4. Processing Executed in the Game Device]

Figure 11:
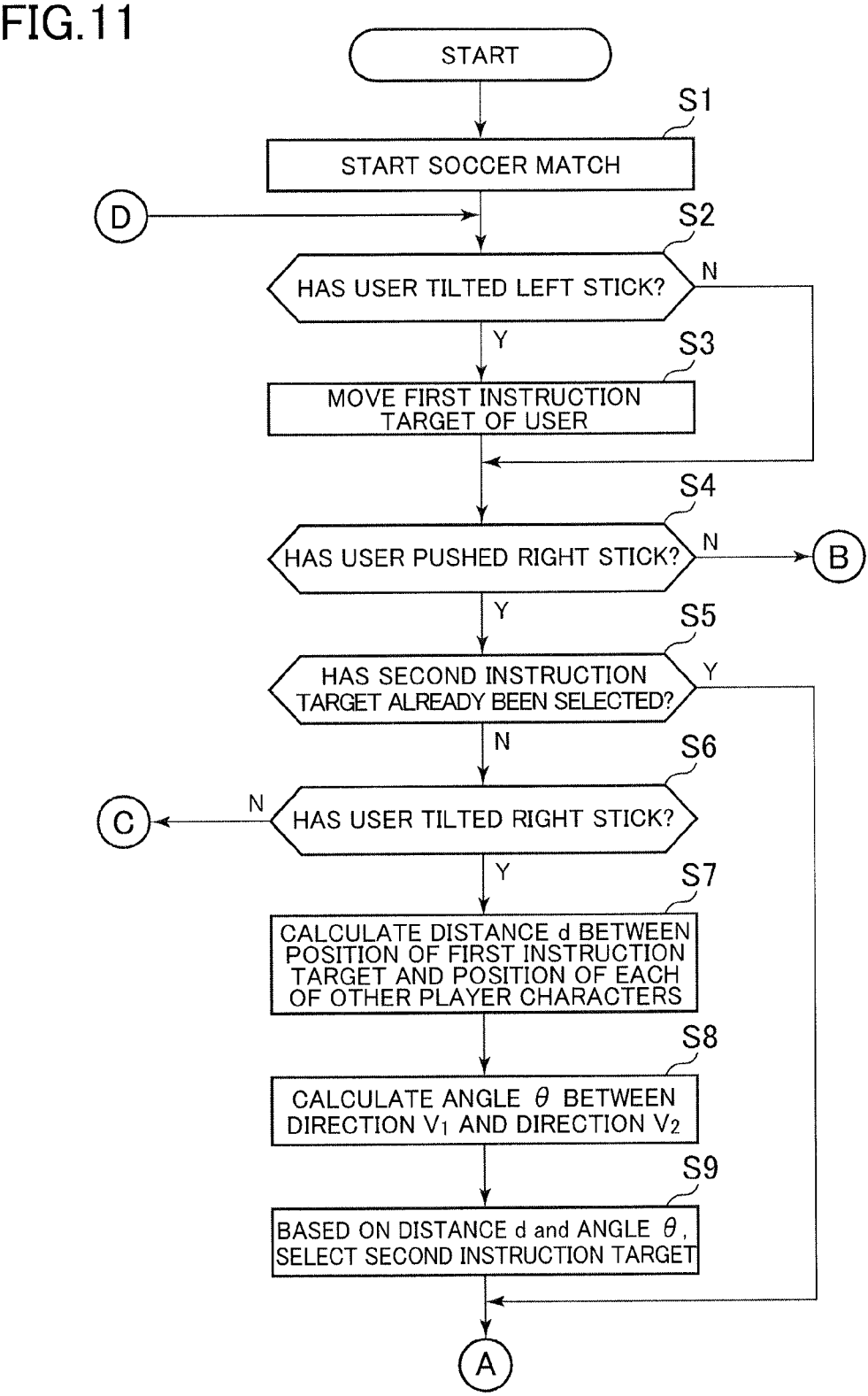
[FIG. 11] A flowchart illustrating processing executed by the game device.

FIGS. 11 and 12 are flowcharts illustrating processing executed by the game device 10. The control unit 14 executes the processing illustrated in FIGS. 11 and 12 when a match is started in the game. The control unit 14 executes the processing illustrated in FIGS. 11 and 12 in accordance with the program stored in the optical disc 36.

First, as illustrated in FIG. 11, the control unit 14 builds the game space 50 in the main memory 16, and starts the soccer match (S1). In the game space 50, various objects illustrated in FIG. 4 are disposed.

The control unit 14 determines whether or not the user has tilted the left stick 44L (S2). For example, based on the tilt information on the left stick 44L acquired from the controller 30, it is determined whether or not the left stick 44L has been tilted.

When the user has tilted the left stick 44L (S2; Y), the control unit 14 moves the first instruction target (for example, the player character 62a) of the user in the moving direction determined based on the direction in which the left stick 44L has been tilted (S3).

In Step S3, the game situation data is referred to, to thereby acquire a current position and moving speed of the first instruction target of the user. A position apart from the current position by a distance determined based on the moving speed and in the moving direction determined based on the direction in which the left stick 44L has been tilted is determined as a position as a destination to which the first instruction target of the user is to be moved.

The control unit 14 determines whether or not the user has pushed the right stick 44R (S4). For example, based on the detection signal of the right stick 44R acquired from the controller 30, it is determined whether or not the right stick 44R has been pushed.

When the user has pushed the right stick 44R (S4; Y), the control unit 14 refers to the game situation data to determine whether or not the second instruction target has already been selected (S5).

When the second instruction target has not been selected (S5; N), the control unit 14 determines whether or not the user has tilted the right stick 44R (S6). For example, based on the tilt information on the right stick 44R acquired from the controller 30, it is determined whether or not the right stick 44R has been tilted.

When the user has tilted the right stick 44R (S6; Y), the control unit 14 refers to the game situation data to calculate the distance d between the position of the first instruction target (for example, the player character 62a) of the user and the position of each of other player characters 62 belonging to the user team (S7).

The control unit 14 next refers to the game situation data and the tilt information from the right stick 44R to calculate the angle θ between the direction $V_1$ connecting the position of the first instruction target (for example, the player character 62a) of the user and the position of each of other player characters 6, and the direction $V_2$ acquired based on the operation state of the right stick 44R (S8).

Based on the distance d calculated in Step S7 and the angle θ calculated in Step S8, the control unit 14 selects the second instruction target from among the player characters 62 acting based on the operation of the computer (S9). For example, the distance d calculated in Step S7 and the angle θ calculated in Step S8 are substituted into a predetermined expression to calculate the evaluation value for each of the player characters 62. Based on the evaluation value, the player character 62 whose distance d is short and whose angle θ is close to 0° is selected. Information indicating the selected player character 62 is stored in the game situation data.

On the other hand, when it is determined that the second instruction target has been selected (S5; Y), the processing proceeds to FIG. 12, and the control unit 14 causes the second instruction target to act based on the operation state of the operation member other than the left stick 44L (S10).

In Step S10, for example, the operation state of the operation member other than the left stick 44L among the operation members of the controller 30 is acquired, and based on the action information associated with the operation state, the second instruction target acts. For example, when the user has tilted the right stick 44R, the second instruction target is moved in the moving direction determined based on the tilt information on the right stick 44R.

On the other hand, when it is not determined that the user has pushed the right stick 44R (S4; N), the processing proceeds to FIG. 12, and the control unit 14 determines whether or not the second instruction target was selected (S11). When it is determined that the second instruction target was selected (S11; Y), the control unit 14 cancels the setting of the second instruction target, and causes the player character 62 which was set as the second instruction target to act based on the operation of the computer (S12). In Step S12, data indicating the second instruction target, which is stored in the game situation data, is updated. In other words, when the user cancels the pushing of the right stick 44R, the setting of the second instruction target is canceled.

The control unit 14 determines whether or not the user has performed an operation other than the operation on the left stick 44L and the right stick 44R (S13). The determination processing in Step S13 is executed based on the detection signal from the controller 30.

When the user has performed an operation other than the operation on the left stick 44L and the right stick 44R (S13; Y), the control unit 14 executes processing based on the operation (S14). In Step S14, for example, the control unit 14 causes the first instruction target of the user to shoot the ball, or temporarily stops the match and displays a menu screen.

Based on the operation of the computer, the control unit 14 causes the player character 62 (64) other than the first instruction target and the second instruction target to act, and updates the game situation data based on the action of the player character 62 (64) (S15). For example, data indicating the state of the player character 62 (64) is updated.

Based on the updated game situation data, the control unit 14 updates the display of the game screen 70 (S16). In Step S16, when the second instruction target is set in Step S9, a new cursor 74 may be displayed on the game screen 70.

The control unit 14 determines whether or not an end condition is satisfied (S17). The end condition only needs to be a condition for ending this processing. For example, whether or not the match has been finished, whether or not an instruction to end the game is input by the user, or other such condition may be used.

When it is determined that the end condition is satisfied (S17; Y), this processing is brought to an end. When it is not determined that the end condition is satisfied (S17; N), the processing returns to Step S2.

According to the game device 10 described above, when the user uses the left stick 44L to move the first instruction target, the user can use the right stick 44R to select the second instruction target and to give an instruction on an action to be performed by the second instruction target. Therefore, the game device 10 enables the user to give an instruction on an action of another character without interfering with the operation of moving an instruction target by the user.

Further, for example, the second instruction target can be moved in the direction in which the right stick 44R has been tilted, and hence while moving the first instruction target by using the left stick 44L, the user can move the second instruction target in any direction, that is, through 360 degrees. When the user cancels the pushing of the right stick 44R, the second instruction target can be brought back under the control of the computer again.

2. MODIFIED EXAMPLES

Note that the present invention is not limited to the embodiment described above. Changes can be appropriately made without departing from the gist of the present invention.

(1) For example, depending on how good or bad the relationship (cooperation) between the first instruction target and the second instruction target is, the action of the second instruction target may be restricted. For example, the following setting may be made. That is, when the cooperation between the first instruction target and the second instruction target is good, the second instruction target can be moved in 16 directions, and when the relationship (cooperation) between the first instruction target and the second instruction target is bad, the second instruction target can be moved in only two directions.

The game data storage unit 80 according to Modified Example (1) stores a game parameter in association with a combination of a plurality of game characters (for example, the player characters (64) belonging to the same team). The game parameter can be rephrased as a parameter indicating how good or bad the relationship between the player characters 62 (64) is.

FIG. 13 is a diagram illustrating a data storage example of the game parameter. As illustrated in FIG. 13, the game parameter is stored in association with a combination of pieces of information identifying two player characters 62 (64) (for example, player IDs). For example, the game parameter takes a value ranging from 0 to 100, and a larger value of the game parameter indicates a better relationship (cooperation) between two player characters 62 (64). Note that the game parameter may not be such a value as illustrated in FIG. 13. Alternatively, for example, the game parameter may be information indicating the level of how good or bad the relationship (cooperation) is (for example, any one of the alphabets "A" to "E", with "A" indicating the best cooperation and with "E" indicating the worst cooperation).

A third control unit 106 according to Modified Example (1) includes means for restricting the action of the second instruction target based on the operation state of one of the plurality of operation members other than the first operation member or a predetermined action (inhibiting the above-mentioned action or the predetermined action from being performed) based on the game parameter associated with the combination of the first instruction target and the second instruction target.

The phrase "restricting the action" means, for example, reducing the number of types of action that can be performed by the second instruction target, or inhibiting the action itself of the second instruction target based on the instruction of the user. For example, an action that can be performed by the second instruction target when the action of the second instruction target is restricted may be defined in the game data storage unit 80.

FIG. 14 is a diagram illustrating association between the operation state of the operation member and the action information indicating an action to be performed by the second instruction target. FIG. 14 illustrates the action information which is used when the action of the second instruction target is restricted. Note that when the action of the second instruction target is not restricted, the second instruction target may act based on the action information illustrated in FIG. 10.

As illustrated in FIG. 14, when the action of the second instruction target is restricted, then compared with the case where the action of the second instruction target is not restricted, the number of types of action that the user can instruct the second instruction target to perform is reduced. For example, even when the user depresses the button 42A, the second instruction target performs no action. Further, for example, the number of directions in which the second instruction target can be moved when the user tilts the right stick 44R is reduced.

In addition, for example, the action of the second instruction target may be restricted by reducing the moving speed of the second instruction target. Further, such association as illustrated in FIG. 14 may not be set, and the third control unit 106 may be inhibited from performing the action control itself.

For example, the third control unit 106 determines whether or not the game parameter associated with the combination of the first instruction target (for example, the player character 62a) and the second instruction target (for example, the player character 62c) of the user satisfies a predetermined condition.

The predetermined condition is a condition regarding the game parameter, for example, a condition indicating whether or not the value indicating the game parameter falls within a predetermined range (for example, a reference value or larger). For example, the predetermined condition is a condition indicating whether or not the level of how good or bad the relationship (cooperation) is between the player characters 62 falls within a predetermined range. For example, when it is determined that the game parameter does not satisfy the predetermined condition, the action of the second instruction target may be restricted.

According to Modified Example (1), the movement of the second instruction target can be restricted depending on how good or bad the relationship (cooperation) between the first instruction target and the second instruction target is. When the relationship (cooperation) between the first instruction target and the second instruction target is relatively bad, it becomes more difficult for the user to cause the second instruction target to act than in a case where the relationship (cooperation) between the first instruction target and the second instruction target is relatively good, and hence the level of amusement of the game can be enhanced.

Moreover, for example, in the case where the second instruction target can be moved in the 16 directions, the user needs to give a detailed instruction on the direction in which the second instruction target is to be moved, but in the case where the moving direction of the second instruction target is restricted to the two directions as in Modified Example (1), the user only needs to give a rough instruction on the direction in which the second instruction target is to be moved, and hence it becomes easier for the user to simultaneously operate the first instruction target and the second instruction target.

Similarly, for example, in a case where the moving speed of the second instruction target is fast, the movement amount of the second instruction target becomes large and it thus becomes difficult to finely adjust the position of the second instruction target, but when the moving speed of the second instruction target is reduced, as in Modified Example (1), the movement amount of the second instruction target becomes small, and hence it becomes easier to finely adjust the position of the second instruction target. As a result, it becomes easier for the user to simultaneously operate the first instruction target and the second instruction target.

Note that in Modified Example (1), the predetermined condition regarding the game parameter and a restriction method for the second instruction target may be associated with each other. The third control unit 106 may restrict the action of the second instruction target based on the restriction method associated with the predetermined condition. For example, depending on the level of how good or bad the relationship (cooperation) between the first instruction target and the second instruction target is, a degree to which the action of the second instruction target is restricted may be changed in a stepwise manner.

(2) Further, for example, when the relationship (cooperation) between the first instruction target and the second instruction target is relatively bad, the third control unit 106 may wait for the start of executing the action control, and a time point at which the second instruction target starts moving may be delayed. For example, for two seconds after the cursor 74 indicating the fact that the player character is selected as the second instruction target is displayed on the game screen 70, the user may be inhibited from operating the second instruction target.

A third control unit 106 according to Modified Example (2) includes means for, regarding the second instruction target, causing the execution start of the action based on the operation state of one of the plurality of operation members other than the first operation member, or causing a predetermined action to wait based on the game parameter associated with the combination of the first instruction target and the second instruction target.

For example, the above-mentioned means causes the execution start of the action of the second instruction target to wait until a waiting time period elapses from a reference time, and cancels the waiting when the waiting time period elapses from the reference time. For example, the "reference time" is a time based on a time at which the second instruction target is selected by the selection unit 110, and is, for example, a time at which the cursor 74 is displayed on the game screen 70.

A length of the waiting time period may be controlled based on the value of the game parameter associated with the combination of the first instruction target and the second instruction target. For example, the waiting time period is controlled to be relatively long when the value of the game parameter associated with the combination of the first instruction target and the second instruction target is relatively small.

In a state in which the execution start of the action of the second instruction target is caused to wait, for example, the second instruction target is not moved based on the instruction of the user. Specifically, for example, even when the user tilts the right stick 44R, the second instruction target does not move in the direction in which the right stick 44R has been tilted. In this time period, the second instruction target may move based on, for example, the operation of the computer.

(3) Still further, for example, it is conceivable that the user will play the game while looking at the first instruction target, and hence when the first instruction target and the second instruction target are too far apart from each other, there is a high possibility that the user will not look at the second instruction target. In such case, it is difficult for the user to give an appropriate instruction on the action of the second instruction target, and hence the second instruction target may act based on the operation of the computer.

A third control unit 106 according to Modified Example (3) includes means for determining whether or not the distance between the first instruction target and the second instruction target is a reference distance or longer. The third control unit 106 refers to the game situation data to determine whether or not an interval between the position of the first instruction target and the position of the second instruction target is the reference distance or longer.

The reference distance only needs to be a distance that is determined in advance. Note that the reference distance may be, for example, a distance that is determined based on how wide a field of view of the virtual camera 68 is. In this case, a distance that is determined based on a distance between the position of a point of view of the virtual camera 68 and the position of an end portion of the field of view (position appearing in the end portion of the game screen 70) may be set as the reference distance. For example, the reference distance may be dynamically calculated based on the state of the virtual camera 68.

For example, when the first instruction target is displayed in the vicinity of the center of the game screen 70, there is a high possibility that the user will be looking at the vicinity of the point of regard of the virtual camera 68, and hence when the second instruction target moves to a position that is separated from the point of regard, there is a high possibility that the user will not look at the second instruction target. Therefore, based on the reference distance determined as described above, the setting of the second instruction target may be canceled as follows.

Further, when the distance between the first instruction target and the second instruction target is the reference distance or longer, the third control unit 106 causes, instead of the action control performed by the third control unit 106, the second control unit 104 to perform the action control on the second instruction target. In this case, the setting of the second instruction target on the player character 62 which has been set as the second instruction target is canceled, and the player character 62 moves based on the operation of the computer.

According to Modified Example (3), when the first instruction target and the second instruction target of the user become separated from each other, by canceling the setting of the second instruction target to cause the second instruction target to act based on the operation of the computer, it is possible to assist the user in their operation.

(4) Further, for example, the number of times the user can give an instruction on the action of the player character 62 other than the first instruction target may be determined in advance.

A game data storage unit 80 according to Modified Example (4) stores count information on the number of times the third control unit 106 has previously performed the action control on the second instruction target. The count information may indicate the number of times the third control unit 106 has previously performed the action control on the second instruction target, or may indicate the number of times obtained by subtracting, from a given maximum number of times, the number of times the third control unit 106 has previously performed the action control on the second instruction target.

An action control unit 100 according to Modified Example (4) determines whether or not the number of times the third control unit 106 has previously performed the action control on the second instruction target is a predetermined number of times or more. This determination processing is executed based on, for example, whether or not the number of times indicated by the count information falls within a predetermined range. Note that the predetermined number of times may be the number of times determined in advance, or may be variable depending on the strength of the computer as an opponent or the like.

Moreover when the number of times the third control unit 106 has previously performed the action control on the second instruction target is the predetermined number of times or more, the action control unit 100 restricts the selection processing by the selection unit 110 or the action control by the third control unit 106. In a state in which the selection processing by the selection unit 110 is restricted, even when the user tilts the right stick 44R, the second instruction target is not selected. Specifically, the processing performed in Steps S7 to S9 is skipped, and the processing of selecting the second instruction target is not executed.

A restriction method for the action control performed by the third control unit 106 may be the same as those of Modified Example (1) and Modified Example (2). Specifically, by reducing the number of types of action that the user can instruct the second instruction target to perform, inhibiting the third control unit 106 from performing the action control on the second instruction target itself, or setting the waiting time period before the second instruction target starts its action, the action control performed by the third control unit 106 may be restricted.

According to Modified Example (4), the number of times the user can give an instruction on the action of the second instruction target can be set. For example, in a case where the user always gives an instruction on a plurality of player characters 62, the number of player characters 62 that act in response to the instruction of the user increases, and hence a processing load on the game device 10 may increase. Therefore, by setting a restriction on the number of times as in Modified Example (4), it is possible to alleviate the processing load on the game device 10.

(5) Further, for example, in the embodiment and modified examples described above, the case where the action information indicating the action to be performed by the second instruction target is associated with the operation state of the right stick 44R or the like has been described. It is not always necessary that the action information be associated with the operation state, and when the second instruction target is selected, the second instruction target may perform a predetermined action. Specifically, when the second instruction target is selected, the second instruction target automatically performs the predetermined action. The predetermined action may be defined in the action information.

For example, the third control unit 106 may move the second instruction target in a reference direction within the game space 50. The reference direction is a direction in which the second instruction target is to move, and is a direction that is determined in advance. For example, the reference direction may be a direction from the second instruction target toward the goal 60 associated with the opponent team. Note that the distance by which the third control unit 106 moves the second instruction target in the reference direction may be determined in advance. When the second instruction target has moved by the above-mentioned distance, the action of the second instruction target is controlled by the second control unit 104.

As another example, the second instruction target may move to a vacant space on the pitch 59. For example, a control area is set so as to include the position of each of the player characters 62 (64), and the second instruction target may move in an area of the pitch 59 that is not the control areas. Further, for example, the second instruction target may move toward the ball 66. Further, for example, the second instruction target may move toward any one of the player characters 62 (64). Further, for example, the second instruction target may perform a predetermined action (such as jumping).

Still further, for example, the predetermined action that the second instruction target is to move to perform may be associated with a role of the second instruction target in the game (such as forward and defender) to be stored. Specifically, when the second instruction target is a forward, the second instruction target moves toward the goal 60 associated with the opponent team, and when the second instruction target is a defender, the second instruction target may move toward the goal 60 associated with the user team.

(6) Further, for example, the method of selecting the player character 62 by the selection unit 110 is not limited to the example of the embodiment. The method of selecting the player character 62 by the selection unit 110 only needs to be a method based on the direction acquired based on the operation state of the right stick 44R. As another example, the player character 62 may be selected based on the positional relationship between a straight line extending toward the direction $V_2$ from the position of the player character 62 (64) keeping the ball 66 (or the position of the ball 66) and the player character 62. For example, the player character 62 existing at a position closest to the above-mentioned straight line may be selected as the second instruction target.

As still another example, the second instruction target may be selected based on the position of the first instruction target of the user, the position of the point of view of the virtual camera 68, the position of any one of the player characters 62 (64), or a given position on the pitch 59, and on the direction acquired based on the operation state of the right stick 44R. Further, the second instruction target may be selected based on at least one of the positions described above and on the direction acquired based on the operation state of the right stick 44R.

(7) Further, for example, the direction instruction operation is not limited to the operation of tilting the left stick 44L or the right stick 44R. It is only necessary that a given operation state among the operation states of the operation members that can be detected by the game device 10 be detected so that the direction instruction operation is performed.

Still further, for example, the operation member used by the user to perform the direction instruction operation is not limited to those of the controller 30. Various kinds of known operation means are applicable as the operation member used by the user to perform the direction instruction operation, and alternatively, for example, a touch panel may be used. In this case, for example, an action of the user touching the touch panel with their finger and sliding their finger corresponds to the direction instruction operation. For example, a portion of the touch panel that is to come in contact with the left hand of the user may correspond to the first operation member, and a portion of the touch panel that is to come in contact with the right hand of the user may correspond to the second operation member.

(8) Further, for example, the game space 50 is described as a three-dimensional space as illustrated in FIG. 4, but the game space according to the present invention may be a two-dimensional game space in which the positions and the like of the player character (64) and the ball 66 are managed by two coordinate elements.

(9) Further, for example, the present invention can be applied to the game device for executing a game other than the soccer game. The present invention can be applied to a game configured so that characters move within a game space. For example, the present invention can also be applied to a game device for executing a basketball game, an ice hockey game, an American football game, or the like. In addition, for example, the present invention can also be applied to a game device for executing a first person shooting (FPS) game, an action game, or the like.

The invention claimed is:

1. A game device for executing a game configured so that a plurality of characters move within a game space, comprising:
    at least one microprocessor; and
    a plurality of operation members comprising a first operation member which is used by a user to perform a direction instruction operation and a second operation member which is used by the user to perform a direction instruction operation;
    wherein the at least one microprocessor configured to:
    move a first instruction target of the user among the plurality of characters based on a moving direction which is acquired based on an operation state of the first operation member;
    cause each of characters of the plurality of characters other than the first instruction target of the user to act based on an operation of a computer;
    select, from among the characters that act based on the operation of the computer, a second instruction target of the user based on a direction which is acquired based on an operation state of the second operation member; and
    cause, in place of the action control performed by the operation of the computer, the second instruction target to perform any one of a predetermined action and an action based on an operation state of one of the plurality of operation members other than the first operation member.

2. The game device according to claim 1, wherein the at least one microprocessor:
    acquire a game parameter from a storage that stores the game parameter in association with a combination of the plurality of characters; and
    restrict, regarding the second instruction target, any one of the predetermined action and the action based on the operation state of the one of the plurality of operation members other than the first operation member, based on the game parameter associated with a combination of the first instruction target and the second instruction target.

3. The game device according to claim 1, wherein the at least one microprocessor:
    acquire a game parameter from a storage that stores the game parameter in association with a combination of the plurality of characters; and
    cause, for the second instruction target, an execution start of any one of the predetermined action and the action based on the operation state of the one of the plurality of operation members other than the first operation member, to wait based on the game parameter associated with a combination of the first instruction target and the second instruction target.

4. The game device according to claim 1, wherein the at least one microprocessor:
    determine whether or not a distance between the first instruction target and the second instruction target is a reference distance or longer; and
    cause, in a case where the distance between the first instruction target and the second instruction target is the reference distance or longer, the second instruction target to act based on the operation of the computer instead of any one of the predetermined action and the action based on the operation state of one of the plurality of operation members other than the first operation member.

5. The game device according to claim 1, wherein the at least one microprocessor:
    acquire count information, which indicates a number of times the second instruction target performed any one of the predetermined action and the action based on the operation state of one of the plurality of operation members other than the first operation member, from a storage that stores the count information;
    determine whether or not the number of times is a predetermined number of times or more; and
    restrict, in a case where the number of times is the predetermined number of times or more, selection processing or any one of the predetermined action control and the action control based on the operation state of one of the plurality of operation members other than the first operation member.

6. A method of controlling a game device including at least one microprocessor for executing a game configured so that a plurality of characters move within a game space, comprising:
    acquiring, by the at least one microprocessor, information indicating operation states of a plurality of operation members comprising a first operation member which is used by a user to perform a direction instruction operation and a second operation member which is used by the user to perform a direction instruction operation;
    moving, by the at least one microprocessor, a first instruction target of the user, among the plurality of characters, based on a moving direction which is acquired based on an operation state of the first operation member;
    causing, by the at least one microprocessor, each of characters of the plurality of characters other than the first instruction target of the user to act based on an operation of a computer;
    selecting, by the at least one microprocessor, from among the characters that act based on the operation of the computer, a second instruction target of the user based on a direction which is acquired based on an operation state of the second operation member; and
    causing, by the at least one microprocessor, instead of the action control based on the operation of the computer, the second instruction target to perform any one of a predetermined action and an action based on an operation state of one of the plurality of operation members other than the first operation member.

7. A non-transitory computer readable information storage medium having a program recorded thereon, the program causing a computer to function as a game device for executing a game configured so that a plurality of characters move within a game space, the program causing the computer to function as:
    a unit that acquires information indicating operation states of a plurality of operation members comprising a first operation member which is used by a user to perform a direction instruction operation and a second operation member which is used by the user to perform a direction instruction operation;

a first control unit that moves a first instruction target of the user, among the plurality of characters, based on a moving direction which is acquired based on an operation state of the first operation member;

a second control unit that causes each of characters of the plurality of characters other than the first instruction target of the user to act based on an operation of the computer;

a selection unit that selects, from among the characters on which the second control unit performs action control, a second instruction target of the user based on a direction which is acquired based on an operation state of the second operation member; and a third control unit that causes, instead of the action control performed by the second control unit, the second instruction target selected by the selection unit to perform any one of a predetermined action and an action based on an operation state of one of the plurality of operation members other than the first operation member.

8. A game device for executing a game configured so that a plurality of characters move within a game space, comprising:

a plurality of operation members comprising a first operation member which is used by a user to perform a direction instruction operation and a second operation member which is used by the user to perform a direction instruction operation;

first control means for moving a first instruction target of the user among the plurality of characters based on a moving direction which is acquired based on an operation state of the first operation member;

second control means for causing each of characters of the plurality of characters other than the first instruction target of the user to act based on an operation of a computer;

selection means for selecting, from among the characters on which the second control means performs action control, a second instruction target of the user based on a direction which is acquired based on an operation state of the second operation member; and third control means for causing, in place of the action control performed by the second control means, the second instruction target selected by the selection means to perform any one of a predetermined action and an action based on an operation state of one of the plurality of operation members other than the first operation member.

9. A game device for executing a game configured so that a plurality of characters move within a game space, comprising:

a plurality of operation members comprising a first operation member which is used by a user to perform a direction instruction operation and a second operation member which is used by the user to perform a direction instruction operation;

a first control unit that moves a first instruction target of the user among the plurality of characters based on a moving direction which is acquired based on an operation state of the first operation member;

a second control unit that causes each of characters of the plurality of characters other than the first instruction target of the user to act based on an operation of a computer;

a selection unit that selects, from among the characters on which the second control means performs action control, a second instruction target of the user based on a direction which is acquired based on an operation state of the second operation member; and a third control unit that causes, in place of the action control performed by the second control unit, the second instruction target selected by the selection unit to perform any one of a predetermined action and an action based on an operation state of one of the plurality of operation members other than the first operation member.

\* \* \* \* \*